United States Patent
Botner et al.

(10) Patent No.: US 10,838,919 B2
(45) Date of Patent: Nov. 17, 2020

(54) AUTOMATED INTERPRETATION FOR THE LAYOUT OF STRUCTURED MULTI-FIELD FILES

(71) Applicant: Acxiom Corporation, Conway, AR (US)

(72) Inventors: Mark Botner, Little Rock, AR (US); W. Dwayne Collins, Conway, AR (US)

(73) Assignee: Acxiom LLC, Conway, AR (US)

( * ) Notice: Subject to any disclaimer, the term of this patent is extended or adjusted under 35 U.S.C. 154(b) by 260 days.

(21) Appl. No.: 15/771,326

(22) PCT Filed: Oct. 28, 2016

(86) PCT No.: PCT/US2016/059378
§ 371 (c)(1),
(2) Date: Apr. 26, 2018

(87) PCT Pub. No.: WO2017/075392
PCT Pub. Date: May 4, 2017

(65) Prior Publication Data
US 2018/0314711 A1    Nov. 1, 2018

Related U.S. Application Data

(60) Provisional application No. 62/248,619, filed on Oct. 30, 2015.

(51) Int. Cl.
*G06F 16/16* (2019.01)
*G06F 7/00* (2006.01)
(Continued)

(52) U.S. Cl.
CPC ............. *G06F 16/16* (2019.01); *G06F 7/00* (2013.01); *G06F 16/258* (2019.01); *G06F 16/86* (2019.01); *G06N 5/04* (2013.01)

(58) Field of Classification Search
CPC ........ G06F 16/86; G06F 16/258; G06F 16/16; G06F 7/00; G06N 5/04
See application file for complete search history.

(56) References Cited

U.S. PATENT DOCUMENTS 5,119,491 A    6/1992 Iwai et al.
5,586,196 A    12/1996 Sussman
(Continued)

OTHER PUBLICATIONS

Phillips, Reid et al., "Automateing File Scheme Recognition via Content-Based Oracles," IKE Conf. (Jul. 2008).
(Continued)

*Primary Examiner* — Miranda Le

(57) ABSTRACT

An entirely automated system for the interpretation of the field layout for multi-field files uses a rich contextual framework constructed by the interaction of three subsystems to provide a holistic view of the contexts of a structured data file as defined by the location and data type of each field. The roles of each of the subsystems are (1) the determination of the file's metadata and positions of the different data fields; (2) the use of fallible oracles (i.e., no oracle must be capable of identifying the type for every record) to provide a set of interpretations of the fields at several levels; and (3) the accurate determination of the location and specific data type for each field without the necessity to interpret every record correctly, even in the presence of ambiguity of data. The system may operate on both delimited and fixed-width structure files.

13 Claims, 8 Drawing Sheets

(51) Int. Cl.
*G06F 16/84* (2019.01)
*G06F 16/25* (2019.01)
*G06N 5/04* (2006.01)

(56) References Cited

U.S. PATENT DOCUMENTS

| | | | |
|---|---|---|---|
| 5,778,359 A | 7/1998 | Stent | |
| 6,094,684 A * | 7/2000 | Pallmann | G06F 9/54 |
| | | | 709/227 |
| 6,493,858 B2 * | 12/2002 | Solomon | G06F 30/39 |
| | | | 716/119 |
| 6,662,340 B2 | 12/2003 | Rawat et al. | |
| 7,305,129 B2 | 12/2007 | Chellapilla et al. | |
| 7,305,612 B2 | 12/2007 | Chakraborty | |
| 7,792,814 B2 * | 9/2010 | Cohen | G06F 16/338 |
| | | | 707/707 |
| 7,849,048 B2 * | 12/2010 | Langseth | G06F 16/254 |
| | | | 707/602 |
| 8,078,551 B2 | 12/2011 | Bar | |
| 8,135,814 B2 * | 3/2012 | Armanino | H04L 41/024 |
| | | | 709/223 |
| 8,341,096 B2 | 12/2012 | Fisher et al. | |
| 8,468,244 B2 | 6/2013 | Redlich et al. | |
| 8,619,090 B2 * | 12/2013 | Spada | G06F 40/177 |
| | | | 345/581 |
| 9,047,392 B2 * | 6/2015 | Wilkes | G06F 16/2452 |
| 9,058,543 B2 * | 6/2015 | Campbell | G06K 9/6202 |
| 9,092,423 B2 * | 7/2015 | Moraleda | G06F 40/284 |
| 9,268,803 B2 * | 2/2016 | Kapochunas | G06Q 10/06375 |
| 2006/0053133 A1 * | 3/2006 | Parkinson | G06F 40/216 |
| 2006/0242180 A1 | 10/2006 | Graf et al. | |
| 2013/0066818 A1 * | 3/2013 | Assadollahi | G06N 20/00 |
| | | | 706/12 |
| 2014/0114929 A1 * | 4/2014 | Henrichs | G06F 16/258 |
| | | | 707/687 |
| 2014/0310225 A1 * | 10/2014 | Huang | G06N 5/025 |
| | | | 706/48 |
| 2015/0363167 A1 * | 12/2015 | Kaushik | G06F 16/221 |
| | | | 707/753 |
| 2016/0210297 A1 * | 7/2016 | Francis | G06F 16/116 |

OTHER PUBLICATIONS

Phillips, Reid et al., "Text File Layout Inference," slide presentation (Oct. 29, 2008).
Moen, Marie-Francine, "Automatic Indexing and Abstracting of Document Texts," book summary (Apr. 2006).

* cited by examiner

AUTOMATED INTERPRETATION FOR THE LAYOUT OF STRUCTURED MULTI-FIELD FILES

TECHNICAL FIELD

This invention pertains to an automated method for the identification of the specific data type of each field (i.e., the layout) in a data file, which may be represented as a table where each row represents a single record and each column represents a specific attribute/name field, such as are commonly used for business data services and other business purposes.

BACKGROUND ART

References mentioned in this background section are not admitted to be prior art with respect to the present invention.

Businesses today must consume enormous volumes of data that include, for example, existing client data, inventory data, prospective data for new clients and products, and other related business data necessary to make critical business decisions. This data may be represented by numerous files, some of which may contain millions of records that each comprises hundreds of fields. Often, such files are sourced from clients or data aggregation companies and contain no layout or field format information. Fixed-width files (i.e., those files where each field for each record has the same number of character positions/bytes) most commonly come with no layout. These data files require some preprocessing step that provides a highly accurate description of the layout. Performing this step manually is error prone and costly.

Files that contain data, such as data used for business data services, are commonly organized as a series of records, each record containing a number of fields. Each field is associated with a particular attribute. For example, in a file that contains records containing to consumer data, each record may pertain to a single consumer, and the fields included in each record may include, for example, a first name, last name, street address, city, state, ZIP code, telephone number, demographic data (such as age, gender, and income), and prior purchase activity. Often, the data may be represented as a table, with each row of the table representing a record and each column representing a field. When a file of this type is to be ingested (i.e., processed), such as for the purpose of enhancing the file with additional data, performing data "hygiene" (deduplication and standardization), data analytics, or other business activities, the type of data in each of the fields in each record of the file must be accurately recognized. This is a result of the fact that there is no standardized format for such file records across the industry. Traditionally, this step of identifying the type of data in each record field (i.e., the type of data in each column) has been performed manually. Persons who process this type of data regularly simply look at each of the columns of data as displayed on a computer screen and assign a label to the column (field) based on what they are seeing. This approach, depending upon human accuracy, is error prone, very time consuming, and costly. These errors originate from the manual sequencing of large numbers of fields to be identified (since, as noted above, a record may contain hundreds of fields), as well as each field's identification being based, in many cases, on only one or extremely few records. It is simply not practical for a human to review all of the records in a file that may contain millions of individual records (rows).

In addition, if a "layout" (e.g., a header row) is provided with the file, there is a strong tendency of a human reviewer to rely on that information, with no validation with the data itself within the file. In many cases, the provided layout may be inaccurate or incomplete. This can happen, for example, if the data layout is from an earlier version of the file or contains incorrect information. Even in the case of the existence of a correct layout, there is no standardized naming convention for each field data type, and thus the layout description must itself be analyzed to determine its meaning.

Where no layout is provided, some fields simply cannot be identified accurately by looking only at the information in that particular field. For example, a field that contains "y" and "n" characters likely represents a "yes" or "no" answer to a question, but without additional context it is impossible to determine what that question is, and thus what the answer means.

As businesses continue to consume more tabular data and both the number of records and number of fields within each record grows, the overall overhead of manual identification and validation of the data types for each field of importance continues to increase. A variety of specific issues can cause this process to be inefficient. Such data files are often delimited, where adjacent field values are separated, for example, by a common delimiter character. The following table provides a simple example of such a file that uses a comma delimiter.

TABLE 1

1, John, Doe, 123 Main St., Little Rock, AR, 72207
2, Mary, Smith, 456 1st Street, Phoenix, AZ, 85001
3, Fred, Jones, 2006 Lovers Ln., Dallas, Tx, 75201
4, Martin, VanBuren, 1902 Cleveland St., Kinderhook, NY, 12106

Many files, however, continue to use a fixed-width layout, where each field has a fixed character width and is padded with a single fixed character. Table 2 is an example of such a fixed-width file that uses the blank character as the padding.

TABLE 2

| 1 | John | Doe | 123 | Main St. | Little Rock | AR72207 |
| 2 | Mary | Smith | 456 | 1st Street | Phoenix | AZ85001 |
| 3 | Fred | Jones | 2006 | Lovers Ln. | Dallas | TX75201 |
| 4 | Martin | VanBuren | 1902 | Cleveland St. | Kinderhook | NY12106 |

For delimited files, the accurate identification of the delimiter can be difficult, because traditional delimiters can actually also appear within legitimate field values with unexpected positional frequency. Also, even if a file layout is provided, it can be inaccurate or uses business specific field names that are not commonly used or understood. In these cases the field delimiter and the layout identification must be determined by the actual data content.

For fixed width files, if a layout is provided, the given layout information can appear in several different representations. All representations are intended to indicate each field's name as well as its width and location in the record. This positional information of each field can appear as a sequence of field widths, where the starting and ending locations of each field must be computed from these values or as starting locations. In this latter case there are two variants, an index representation where the leading position is represented by the digit 1, and an offset representation where the leading position is represented by the digit 0. The type of representation must be inferred from the layout. In case there is no layout, the identification of the field positions must also be determined by the actual data, and for large files with significant variance in the data in each record, such determinations can be difficult and time consuming.

Once the field positions are identified, each field's data type must be identified so that the subsequent appropriate information may be extracted and validated by commonly used traditional parsing techniques. However, the accurate location and data type identification for each field is critical for these automated parsing techniques to extract the data correctly.

The present state of the art for accurate field location and data type identification is, as noted above, one of using a purely manual process, or in some cases using an automated system to augment the manual efforts. These automated systems identify a small set of field data types such as names, addresses, and well-known identification strings such as monetary values, telephone numbers, and dates. However, such automated systems embed rigid and very limited expected formats for each of these data types. Because data files originate and are created from a wide variety of sources and contexts, many of these data types can appear in many ways. For example, some of the valid formats found in data files for the date of Oct. 5, 2016, include "10/05/2016", "20161005", "100516", and "2016OCT05." Also, although such dates often occur within a single field, they can also be split into separate fields. For example, the year can be separated from the month/day information, or all three components may be presented within different fields in multiple possible orders. Similarly, each of names and addresses can be expressed in a single field or multiple fields, and the order of these fields in terms of their components is not uniform in data files (i.e., both first name/last name and last name/first name consecutive fields are common). Also, there are many words and character strings that can represent multiple data types. The word "Washington" can easily represent a component of a person's name, a component of a business name, a street name, a state, or a city. Finally, there is no guarantee that the same data representation for a field will be used in all of the records of a file.

In the semi-automated methods present in the current art, each seeks to determine the field types of a single record at a time, and the final decisions are based on a pre-determined ranked system of accuracy and/or probability for each algorithm applied. However, it is important to note that these approaches are fallible due to the variability of both the uses of character strings (names) as well as the different representations of alphanumeric character strings (dates, address representations, etc.). Hence these approaches are prone to the ambiguity that results from the record-to-record variances mentioned above. Therefore, in order to dramatically increase the capability and accuracy of such an automated system, and to improve the throughput and reduce computational cycles of a system for determining file layout, the inventors hereof have recognized that this restricted scope of interpretation must be extended into a richer, more contextual one that can make correct decisions from a cognitively deeper framework.

DISCLOSURE OF INVENTION

The present invention addresses the need to reduce the errors and inefficiency that results from manual or semi-automated methods of discerning file layout, and is particularly valuable in the processes of large volumes of business data fields. The invention utilizes a computationally rich context and custom processes that identify and validate each field's data type across these multiple perspectives with very high accuracy. This is achieved through automation with little to no human input and without the use of any provided file layout. The invention improves the ingestion of data files for purposes such as, but not limited to, database management, sales, accounting, direct marketing, and other maintenance activities.

The invention utilizes an approach that uses context from other fields in each of the records in order to determine the meaning of data within a particular field. The invention can, in certain implementations, identify predominate character patterns for certain types of fields, as well as determine whether such fields contain only a small number of distinct values (i.e., enumerations), such as "y" or "n" meaning "yes" or "no." The determination of the layout is accomplished solely by using the file's data itself, which is iteratively interpreted using multiple perspectives to maximize the use of context in determining layout. These perspectives include the interpretation of the sequencing of the data fields' types from the actual data both within an individual record as well as across a large set of records. Also, the identification of the potential data types for each field as well as the relationship of these to the potential data types of adjacent and nearby data fields is used to interpret the exact data type for those fields with multiple possible interpretations. The number of records analyzed may be customized based on the desired trade-off between computational time required and accuracy.

In certain implementations, the invention creates a rich contextual framework by combining three highly interrelated subsystems that view the context of the content of the data file from multiple perspectives. The first subsystem focuses on the identification of the field positions for both delimited files and fixed-width files, as well as the preprocessing steps to identify the character set and different types of delimiters used in the file. The second subsystem consists of a multi-contextual layer of "oracles" (as further explained herein) that interact with each other to determine the possible interpretations of a set of fields. The interactions within these different layers of oracles and the subsequent interpretations incorporate information from a very granular level (one field at a time) to a contextually rich level (sequentially or locally located sets of potentially interrelated fields). The third subsystem consumes a non-trivial portion of the whole input file and uses the results of the two previous subsystems to compute and output the final interpretation of the data file that will be subsequently used to read in and interpret the actual data itself for a business use case-specific application.

One implementation of the invention allows the user to preset how much of the file to use to determine the final layout information. As noted above, using a single record at a time often generates poor and inconsistent results. The more rows that are used in the determination of the layout the more accurate the results will be, but this increase in accuracy will come with a cost in the run-time of the subsystems. As one would expect, there will be a noticeable time difference between using 10,000 rows of a 20-field file and using 10,000,000 rows of a 100-field file. But in either case the time saved by using a fully automated system as set forth herein is far greater than the state of the art techniques, which may require multiple man-hours to man-days. Furthermore, it will be seen that any approach that uses manual review is inherently limited in the number of fields that can be reviewed to make a determination of field types, since it is not possible to review thousands, hundreds of thousands, or even millions of fields manually in making this determination. In one implementation of the invention, a default fixed number of rows to be used in the field analysis is designated, which can be, for example, 10,000 rows. However, the user can easily change that value based on the specific context and size of the file, the expected runtime of the process, and the desired accuracy of the results.

The oracle subsystem is based on a multi-layered collection of oracles, each of which indicates whether a given field in the data has a consistent form of a data type. An "oracle," as that term is used herein, is a software program running on a computer system that appears to the user as a "black box" for high-order decision making. A single oracle has a specific contextual framework in which to respond to a set of input data. For this invention, each potential field data type will have an associated oracle. For example, if the data contains "first name" data, then there will be a first name oracle. The oracle will ingest and subsequently respond to a set of values from a fixed field for all records being evaluated. The response will contain both the truth value of whether the input values appear to be of the assigned data type as well as a small set of associated contextual information. The subsequent use of this information to determine the eventual field data type will not be dependent upon the actual oracle's internal construction, but rather only on its output. Hence there is no hidden assumption that the oracle's response is always correct. For example, in a testing set of 10,000 records, if a large number of them appear to be instances of known first names, then the "first name" oracle would respond positively to that field. Hence these oracles act not on a single row of the data, but rather on a single field or a set of consecutive fields over an appropriate set of records from the file. In this context not every record value in the given field must be interpreted as the designated data type, but rather a significant proportion of the values is recognized as such. Hence the accuracy of the oracle's response is not primarily dependent on the capability of identifying the type for every record's value in the designated field. Similarly, as was noted earlier, there are a large number of "names" that are used in person names, business names, street names, cities, and states. Hence a given field can receive a positive response from multiple oracles. This degree of ambiguity from multiple types of oracles is actually a major strength of this invention's capability of accurate identification of the field data types. In certain implementations, the invention actually leverages the inevitable ambiguity and fallibility of data found in the fields of the various records in the file to identify the field types in a defensible manner by considering all reasonable interpretations for all the columns and then choosing the one set of interpretations that is most cognitively consistent and complete.

In order for the present invention's oracle subsystem to be able to make an accurate holistic decision for the set of fields in the file there are, in certain implementations, three levels of oracles in terms of data types that give different levels of granularity of the interpretation of the field types. The first level of oracles consists of those that can identify primitive data patterns, such as blanks, digit strings, alphabetic strings and alphanumeric strings. These are helpful in the identification of field positions for fixed-width files as well as defining the character structure of fields whose data types are highly specialized, such as inventory parts numbers and other proprietary identifiers. The second level of oracles for this invention consists of those that identify field types that are common to most data files. These include name and address component oracles for first names, last names, name suffixes, street names, unit designators (apartment, level, floor) and city names, as well as for commonly used numeric fields such as phone numbers, dates, zip codes, and Social Security numbers. Business data files also quite often contain autonomized keys for individuals, and hence there may be oracles for different hash strings such as MD5, SHA 1, and SHA 256. Finally, other identifiers for individuals or locations such as email addresses, latitude and longitude, and IP addresses may have corresponding oracles.

In certain implementations, the third level of oracles for this invention consists of "meta"-oracles that are used to interpret the overall meaning of a set of consecutive fields. These oracles are useful in the location of fundamental data types that can cross multiple fields, such as individuals' full names and complete postal addresses. As noted earlier, these data can appear in a single field or as a sequence of adjacent fields. These meta-oracles carry the responsibility of identifying such cases no matter what field format is used. In particular, the input to these oracles is the output of the first two levels of oracles for the identified fields. As mentioned earlier, each field can have positive responses from multiple oracles. Hence these meta-oracles search for data type patterns of consecutive fields that are consistent with multi-field data types as noted above.

These oracles, in certain implementations, also have the capability of recording the frequency of the different data values they find. This is useful to identify enumerated fields such as gender, where only a small set of values or codes are used to express the data. Similarly, these oracles also keep count of the number of records within a field that have definitive evidence of being of the associated data type as well. These counts are quite useful for disambiguating fields that appear to contain the same type of information. The interplay of the different contextual levels of oracles as well as the field specific information offers an extremely rich and disambiguated view of the contents of the sequential fields that no single oracle level view can offer over a wide variety of data files.

In certain implementations, a field location subsystem takes care of both delimited and fixed-width files. For the delimited files, the system looks for potential delimiters from a set of the most frequently used delimiters, which include most of the punctuation characters as well as special space characters. The frequencies and locations of each delimiter are found for a set of records, and the consistency and differences of the counts of each possible delimiter per line is measured across all of the records in the set. If there is a single delimiter that appears to match across all of the records, the oracle subsystem can be called to validate that a subset of the resulting fields can be determined and appear to be contextually meaningful (e.g., there does not appear to be a zip code between a first name field and a last name field). If there are multiple potential delimiters, the oracle subsystem can be used to differentiate the best potential delimiter based on a first pass interpretation of the fields constructed from each delimiter. As some fields can contain the potential delimiter as a valid character for its data type, the agreement need not match exactly across every row. But in these cases the oracle subsystem may check the field types for the necessary consistency of interpretation. For example, an extra comma in a few records still allows for the parsed fields to be parsed correctly due to the consistent structure of the remaining records.

In certain implementations, the identification of the fields in a fixed-width file requires a variety of different perspectives. In particular, image processing edge detection techniques on several types of images generated from the actual data in the files may be employed. One image used is a binary one that maps the rows and columns of the data file to rows and columns of the image by mapping each (row, column) character of the file to 1 (white) if the character is a non-space character and 0 (black) otherwise to the (row, column) position in the image. The edges of at least some of the fields can be identified by those columns whose white portions are maximal in terms of the adjacent columns. This technique works well for those columns for which most of the data values contain blank padding. The second image is created in a similar way, but uses the first-level oracles to differentiate the different types of non-space characters by use of different colors. In one implementation of the invention each of the space characters, the alphabetic characters, the numeric characters, and the punctuation characters are assigned different colors, and the distribution of these colors are used to identify those columns not found by the above method as well as the different character patterns within a given field. This last observation allows for the clear identification of a complete address field as compared to other types of fields. Finally, the oracle subsystem is used on the existing identified fields to determine if any are in fact the concatenation of adjacent fields with identifiable data types that were not found by the above methods.

In certain implementations, the third subsystem consists of the actual process for the identification and validation of the file's layout and uses the previous two subsystems in multiple ways in its processing. This subsystem is responsible for guiding the determination of the file's layout. This subsystem begins by ingesting the subset of records to be used in the analysis and determining the character encoding used to create the file, such as ASCII or UTF8, and the record delimiter. Once the appropriate meta-data for the file has been found, the subsystem then determines whether the file appears to be a delimited one or a fixed-width one. As noted earlier, if there are potential character delimiters found in the file, the identification of a subset of the resulting field data types can occur in the determination of the chosen delimiter. This process interweaves the two previous subsystems to eventually identifying the delimiter (if such a delimiter exists). If no delimiter is identified, then this subsystem creates the two character-type images and the subsequent image processing algorithms are performed to find the first pass determination of the field positions on the now identified fixed width file. Once again, this subsystem can call the oracle subsystem to help in the final determination of the field locations.

In certain implementations, once the field locations have been identified, the oracle subsystem is called to create a view of the different possible interpretations of both the individual fields and sequential subsets of fields. These interpretations are then evaluated and filtered to finally identify the final layout for the data file. This layout is then exported to be consumed by the subsequent downstream process that, in one embodiment, consumes the full file's data.

No system is completely accurate, so of course corrections can be made in case that the resulting layout includes errors. Tests performed by the inventors have shown certain implementations of the invention to be over 97% accurate for a large sampling of different business file layouts for both delimited and fixed-width files, with processing times reduced to as little as a few seconds. This accuracy value is larger than those reported for either manual or mixed systems. The identified errors primarily occurred in very sparsely populated fields that are extremely difficult or impossible to be identified by humans due to inconsistency of the patterns of the existing data values, and thus no better results could be expected with prior art approaches to this problem.

These and other features, objects and advantages of the present invention will become better understood from a consideration of the following detailed description of the preferred embodiments and appended claims in conjunction with the drawings as described following:

BEST MODE FOR CARRYING OUT THE INVENTION

Before the present invention is described in further detail, it should be understood that the invention is not limited to the particular embodiments and implementations described, and that the terms used in describing the particular embodiments and implementations are for the purpose of describing those particular embodiments and implementations only, and are not intended to be limiting, since the scope of the present invention will be limited only by the claims.

Figure 1:
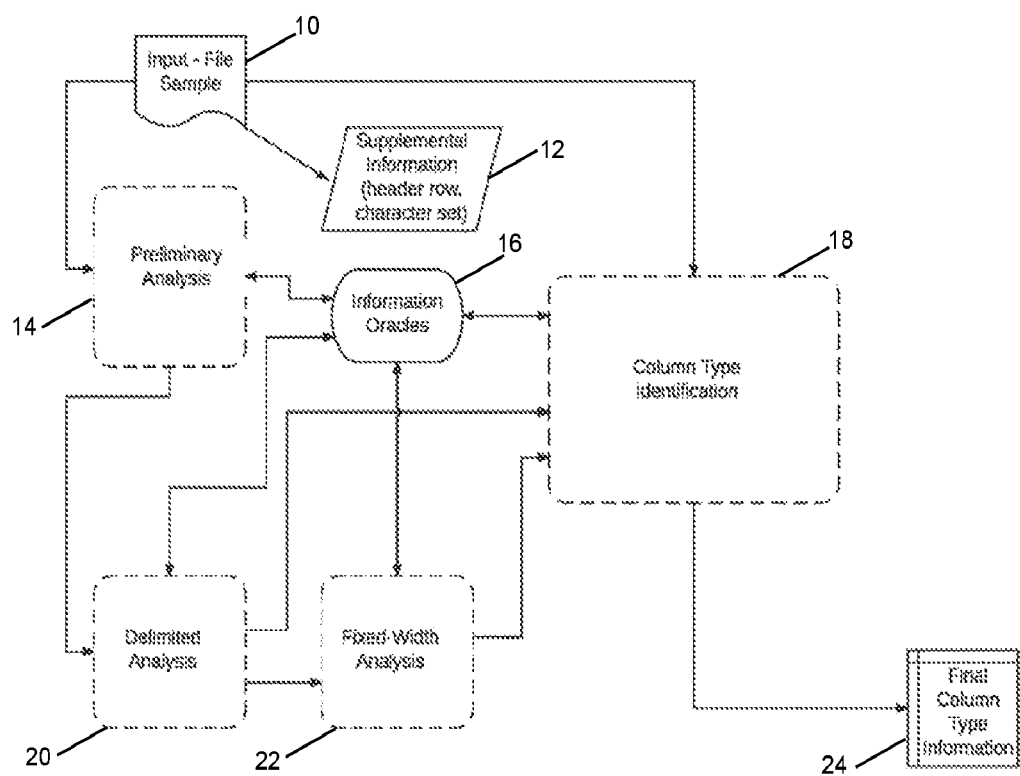
FIG. 1 is a high-level architecture view of a file layout inferencing system according to an implementation of the invention.

With reference to FIG. 1, the overall architectural design for the file layout inferencing system according to an implementation of the invention may now be described. Given the appropriate sample of the input file's records 10, the supplemental information processing 12 includes the determination of the character set used in the encoding of the file as well as whether the file appears to contain a leading row that describes the field layout.

The preliminary analysis 14 primarily focuses on the determination of the record delimiter character. This can be done by using one or more "readline" functions specific to one or more programming languages that can be used in a specific implementation of the invention. For each such available "readline" function, the function is called a small number of times and the resulting character lines are compared. If each line ends with the same one or two characters and there is no dramatic difference in the lengths of the lines, the record delimited is set to this common ending suffix. On the other hand, if no such methods are available or they fail to meet the above criteria, a set of common "end of line" character delimiters can be checked to see which one separates the file into lines. These characters include the "line feed" (LF) and "carriage return" (CR) characters. These characters as well as two character combinations, such as LF+CR or CR+LF, are used to break the file into line segments. Each splitting is once again evaluated in terms of breaking the file into a set of reasonable lines. The character splitting with the best result is chosen as the record delimiter.

Once the record delimiter is determined, additional general record attributes, such as the character length of each record, are determined. These attributes give strong initial hints as to whether the file appears to be a delimited file of variable-width fields or a fixed-width file. If the vast majority of the records' character lengths are equal, then there is a very high chance that the file has a fixed-width format. In that case the ordering of the subsequent field type analysis can be switched (i.e., the fixed width analysis comes first) to increase the efficiency of the processing and reduce processing cycles required to complete the task.

Once this preliminary analysis 14 is complete, the field location subsystem is employed. The delimited analysis portion 20 of this subsystem determines whether there are potential field delimiters that are both consistent in number and resulting field type, which will soon be described in detail. If such a delimiter exists, then it is identified and the file is ready for the identification of the field types. If there is no identified delimiter, then the fixed-width analysis 22 is performed. This analysis identifies field locations via the image processing techniques described above, and in this case the file is once again ready for the subsequent field-type identification process.

The field type identification 18 then collects the results of each non-meta oracle for every identified field location. These results are then interpreted as described in the following section in terms of the number of different types of fields as well as the context of the potential field types for each field and its neighboring fields. The use of the meta-oracles and expected sequencing of different types of fields are used to determine the final interpretation (i.e., a ZIP code is not expected just before a street name). Finally, the oracle subsystem 16 includes confirmatory evidence for the field location analysis as well as the basis for the final decision in identifying the field types. As noted earlier, this oracle subsystem structure allows for high accuracy in the final decisions without clear interpretation of every record's field type.

Figure 2A:
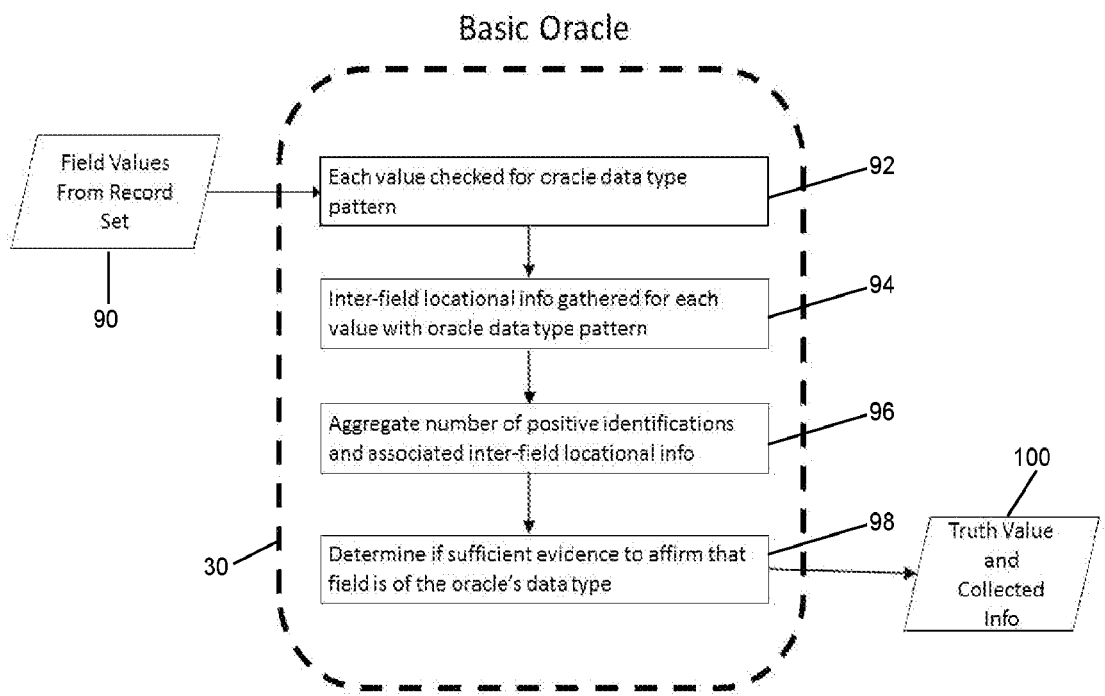
FIG. 2A is a diagram of the operation of a basic oracle according to an implementation of the invention.
Figure 2B:
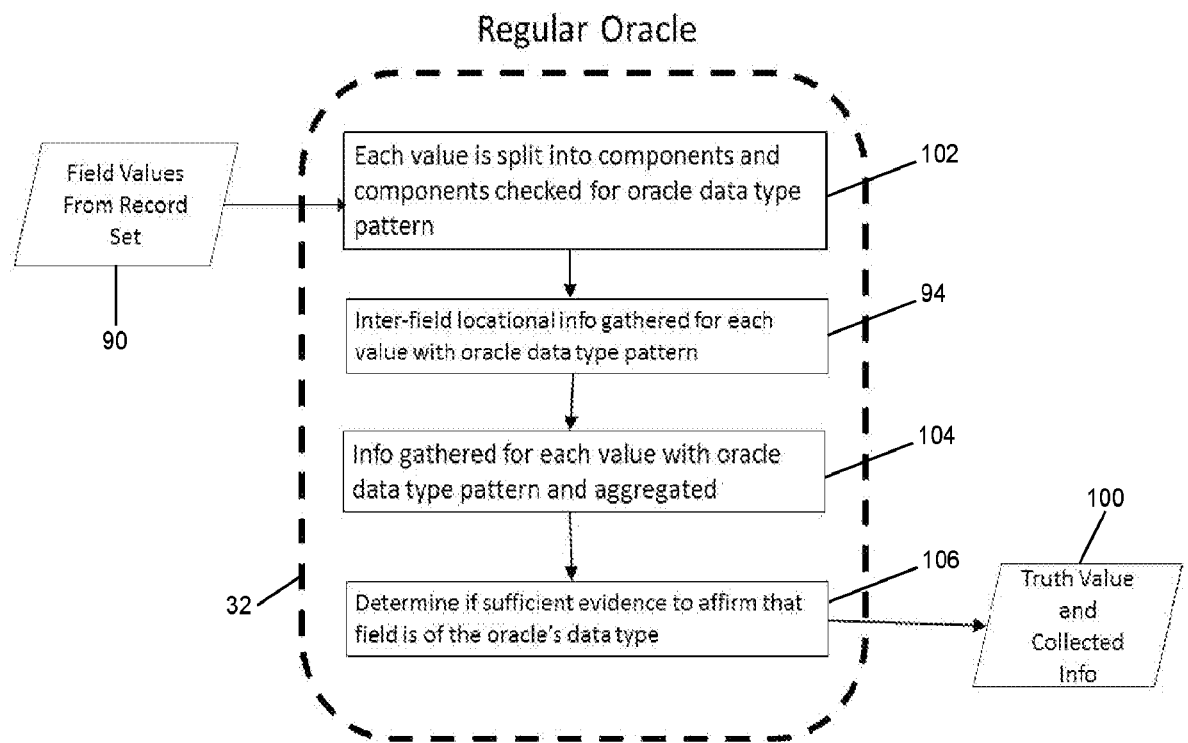
FIG. 2B is a diagram of the operation of a regular oracle according to an implementation of the invention.

FIG. 2A indicates the overall architectural design and flow of each basic oracle, and FIG. 2B indicates the overall architectural design and flow of each regular oracle, in the oracle subsystem. Each data type to be potentially identified has a corresponding oracle whose job is to answer the question, "Is the designated field potentially of your data type?" This is accomplished by passing the actual values for the sample records from the designated field into the oracle as a single set of data.

Each oracle is constructed by setting the framework that will be used to identify values of the oracle's assigned type. The basic oracles as depicted in FIG. 2A only look for the existence of specific types of characters in field values from record set 90, such as whitespace, alphabetic, numeric, and alphanumeric (basic data types). This is accomplished by direct use of implementing computer programming language specific character identification functions ("isNumeric", "isAlpha", etc.) or by very simple regular expressions that are supported by the implementing computer programming language's built-in regular expression library. This processing is performed at step 92. As some fields in data files can contain a very small number of unexpected characters such as periods, apostrophes, and hyphens, the oracle can check to see how many such unexpected characters occurred. If there are only a very few such cases, the characters are removed and the values are checked again to see if the modified value string now has the expected pattern. If so, the value is considered to match, but only after such a small modification. For example, for a "numeric" oracle an input string of "1234.536" is not identified as a numeric value. However, there is only one period in the string and after removing that character the resulting string "1234536" is identified as "numeric" with a very minor modification. Once each value has been checked for the oracle's data type pattern, additional information is computed. In particular, the distribution of the distinct values that are identified as having the oracle's data type is computed, the total number of non-blank values in the fields passed to the oracle, and the number of values that required a minor modification before they were identified as having the oracle's data type. The values are aggregated together at step 96 to be used in the final decision of whether the field is of the oracle's data type.

The distribution of the distinct values identified will be used later to determine whether the field is in fact an enumeration. For example, if a "single character" basic oracle returns a positive response and the distribution of distinct values are 5000 'M's, 3500 'F's, and 4000 blanks, the final decision making effort for all of the fields' types would know this column to be an enumeration and, depending on the field types in the near vicinity of this specific field, could decide that the field represents a gender value. This ability to distinguish whether a basic type field is an enumeration is often critical in the accuracy of the final decision of the file's field types, as will be noted later.

Once this data is computed at step 94 and aggregated at step 96, the oracle makes its decision at step 98. If a large proportion of the total non-blank values are identified as having the data type with no needed modifications, the oracle will identify the field as having the oracle's data type, which is output at 100. If modifications are needed, then the oracle checks to see if only an appropriately small proportion of the values were identified only after a minor modification the same conclusion will be reached. In all other cases, the oracle will not claim a positive data type identification. Finally, if the oracle does not identify the field to be of its data type, a negative response is returned at 100. On the other hand, if the oracle does identify the field as such, both a positive response and a report of the collected data is returned at 100.

FIG. 2B indicates the overall architectural design and flow of each regular oracle in the oracle subsystem. The regular oracles identify common and frequently occurring field types that have at most a small number of common representations. Such field types include phone numbers, dates, names, standard hashes, personal identifiers, and address/location information. However, unlike the basic oracles, these regular oracles must use other techniques besides regular expressions or language-specific type functions to identify their specific data types. For example, oracles that identify name data types such as first names, last names, street names, business names, cities, and states use dictionaries of valid instances for each type. As noted earlier, no oracle must identify its type in a field for every record, and hence these dictionaries need not have comprehensive coverage of the expected names but rather need only contain a strong statistical coverage. Also, in this context some name fields can have supporting regular expression enhancements that look for character strings that exhibit common character patterns indicative of a specific type. For example, a character string that ends in "ville", "ham", "ford" or "ton", starts with "new", "little" or a compass direction, or contains a landscape entity such as "falls" has a high probability of being a city.

In a similar way, primarily numeric data such as valid phone numbers, dates, and zip codes must follow specified patterns. The regular oracles for these data types must check for these patterns in addition to patterns of character types. For example, until recently Social Security numbers were required to follow specific rules that were both geographic and digit pattern based. These rules were dropped in 2011, but the vast majority of individuals have social security numbers that followed these patterns. As the oracle need only identify a sufficient number of these types of values in order to correctly identify such a field's data type, the social security oracle need only check for the pre-2011 rules to be effective and accurate. Thus at step 102, each value is split into components and the components are checked for oracle data type patterns, then processing proceeds to inter-field locational information gathered for each value at step 94, as with the basic oracles.

The common expectation for data files that contain such information is that each such field will use a single representation. However, this is not always the case and hence these oracles consider a wide variety of possible representations of their designated type for each field value for all records. For example, the date oracle must be sensitive to the following potential representations of the date Jan. 7, 2016: 01/07/2016, 01/07/16, 07JAN2016, 01072016, 010716, 1716, as well as other similar variants. These two validation checks must occur simultaneously, as each is directly dependent on the other, at step 102. So if one potential representation results in an invalid date then the oracle must attempt to identify another potential date form. Processing proceeds to aggregation of information gathered for each value with a data type pattern matching that oracle. If no representation is found that results in a valid date interpretation, then the date oracle will consider the value not to have its data type at step 106. In either case, a truth value and collected information is returned at step 100, as with the basic oracle.

In cases such as the first and last names of an individual being in the same field or both the address number and street name appearing in the same field, the regular oracles must also identify if a field appears to contain data of their type even if there is other data within that field. In these cases, the oracles can record the position of their data type instances in such fields. For example, if a field contains many instances of two or more name components such as "JOHN SMITH" then a "first name" oracle will need to analyze each name component retrieved by splitting the full data string by whitespace, i.e. both "JOHN" and "SMITH". This oracle will record that the first name component is a "first name", but the second component is not a "first name". Similarly, a "last name" component would report the appropriate opposite information. This ability to analyze each component in the value's string representation is critical in the final decision making of the field's data type. Hence the first step of a regular oracle is to split each value into its whitespace delimited components at step 102. The oracle then functions as in the previous case of basic oracles, determining whether each component is of the oracle's type. If there is only one component in the field value, it performs in the same manner as the basic oracle described above. On the other hand, if there is more than one component, at least one of the components must be identified as the oracle's data type in order for the oracle to pass on its collected information at step 100. If at least one component of the field's value is identified as the oracle's data type, then the same type of information is collected as in the basic oracle. However, additional contextual information must be added in order to correctly interpret the type of information in the value's character string. This information consists of the number of components that are in the value's string and which of them have been identified as being the oracle's data type, determined at step 104. So in the case of the input address string "123 Washington Ave" a "street number" oracle would report that string with the added information that the street number appears in the first of the three components. The corresponding information will be reported by a "street name" oracle as well as a "street suffix" oracle. It is important to note that since these strings can contain a non-trivial amount of ambiguity, a "last name" oracle will report the same information as the "street name" oracle. In this case the actual oracle itself (its own data type) distinguishes the interpretation when subsequent processing occurs.

The next phase of the oracle's processing is similar to the basic oracle's associated step, namely the identified strings (at least one component identified) and the collected information is aggregated for the decision making, at step 104. The decision-making step again is very similar to the basic oracle's information, but there is one small but extremely important difference. In particular, not only must enough values have been identified positively but there must also be a strong dominant pattern as to which actual components are in fact positively identified. For example, consider the case above concerning addresses. If all of the values have two or three components, then the "street suffix" oracle will only decide that the field contains such a data type if the bulk of the identified cases had a positive response on the last component. Similarly, the "street name" (and possibly the "last name") oracle will return a positive identification if the next to last component (which could be the first component for street addresses with no street number) is the primary identified component. Again, as for the basic oracles the regular oracle returns its decision and associated information. As expected, the additional information that these oracles report for positively identified fields is critical in the final decision-making for the data type layout for the full file at step 106.

The basic oracles 30 and regular oracles 32 interact with each other in cases of ambiguity relative to different interpretations of fields. For example, a numeric basic oracle 30 and a date regular oracle 32 can respond in a positive way to the same field. This indicates that this potential date field's representation is that of just digits (i.e. 01312016) rather than using punctuation (01/31/2016). It is potentially not uncommon to find columns of multiple primary digit types. The fact that the basic oracle 30 has identified a primary feature of the representation allows for far better decision-making, as the positioning of such fields to other field types helps in the interpretation of the digit field. In such cases the correct interpretation is that of just a digit field as it contains business-specific information that can often appear to be a valid date.

Figures 2C, 2D:
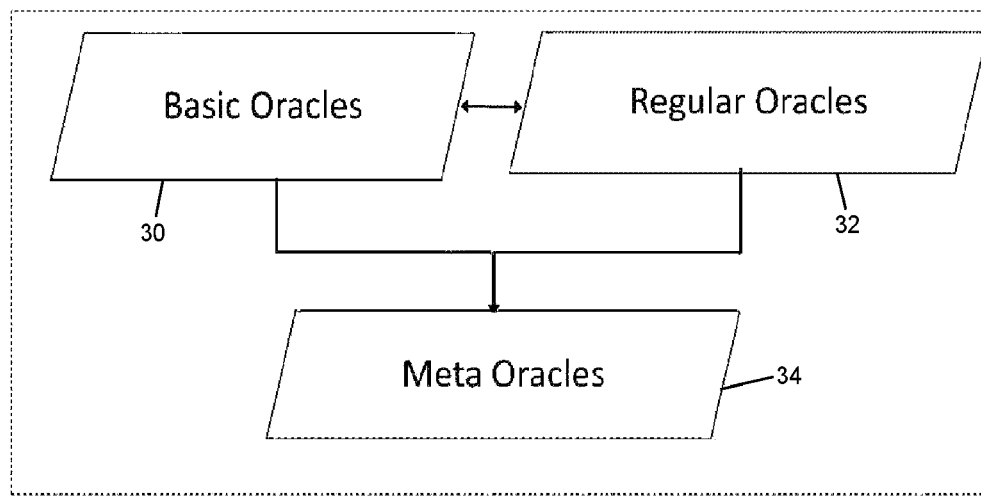
FIG. 2C is a high-level overview of the interrelationship between three levels of oracles within the oracle subsystem of a file layout inferencing system according to an implementation of the invention.
FIG. 2D provides examples of the three types of oracles of a file layout inferencing system according to an implementation of the invention.

The third (or meta) level of oracles 34, as shown in FIG. 2C, attempts to take the output of the previous levels' results and determines if adjacent fields construct more complex data types such as a full name or full address. It considers results for consecutive sequences of fields that have potential interpretations that form these larger data types. This may be explained by the example data given in Table 3.

TABLE 3

| | Oracles | | |
|---|---|---|---|
| | GEORGE | WASHINGTON | CARVER |
| First Name | ✓ | ✓ | |
| Middle Name | ✓ | ✓ | |
| Last Name | | ✓ | ✓ |
| City | | ✓ | |

For example, consider the name "GEORGE WASHINGTON CARVER" that appears in consecutive fields as shown above. The first field receives a positive response from both a first name oracle and middle name oracle; the next second field receives a positive response from a first name, middle name, and last name, and city name oracle; and the third field receives a positive response from the last name oracle. In this case one sequential interpretation of the three fields is first name, middle name, and last name. The name meta-oracle 34 will sift through all of the combinations of the identified data types for this sequence of consecutive fields in an attempt to find a pattern that matches a full name representation (in this case a First Name, Middle Name, Last Name combination). Hence for this case the full name meta-oracle will return a positive identification.

FIG. 2D provides a simplified example of a set of basic oracles 30, regular oracles 32, and meta oracles 34 in table 40. The basic oracles 30 presented are the most frequently appearing ones in certain business data files. Sometimes these oracles must be extended to include patterns that include specific punctuation characters. The regular oracles 32 allow for the identification of name and address components, several specific identifiers, standard anonymous hash values, IP addresses, geolocations, social handles, phone numbers, and gender. Once again this list can be augmented by other values like vehicle identification numbers, general inventory codes, and several binary enumerations (yes/no, true/false, valid/invalid). The two identified meta-oracles 34, full name and full address, are the most common ones found in most business data files.

Figure 3A:
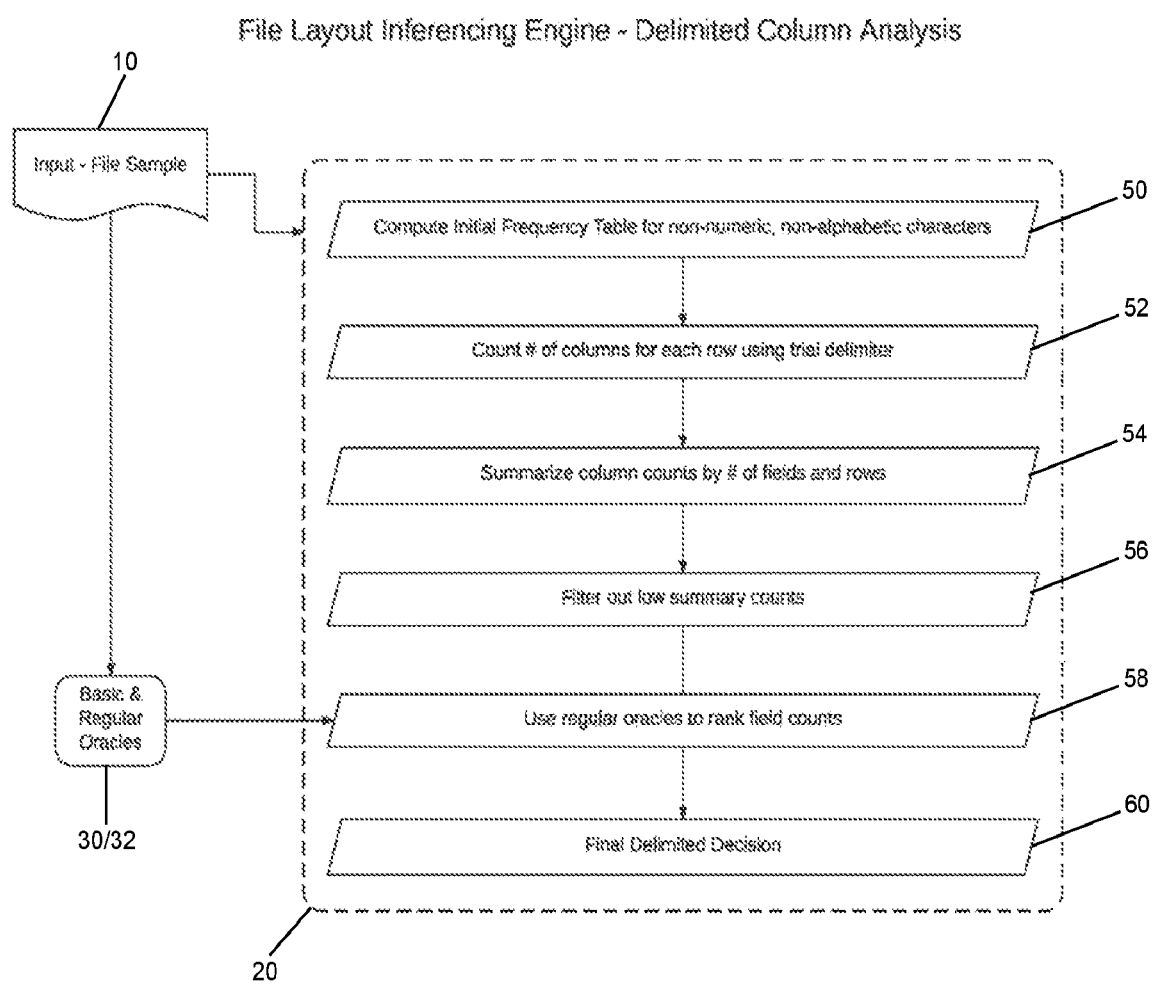
FIG. 3A is a detailed architectural flow of the delimited column analysis portion of the field position subsystem of a file layout inferencing system according to an implementation of the invention.

FIG. 3A illustrates the delimited column analysis 20 from FIG. 1 in more detail. The process first determines if the input data file 10 has (variable length) delimited fields and, if so, determines the specific field delimiter for the file. The first step is to compute the frequencies of the non-numeric and non-alphabetic characters that appear in the sample records of the file at step 50. Often the most frequently occurring such character is the delimiter for the file, but this is not guaranteed. Once this initial frequency distribution is computed, the number of resulting fields using each appropriate delimiter candidate is counted at step 52, and these columns counts are summarized by number of fields and number of records in step 54. The delimiters with relative low summary counts are filtered out at step 56. At this point the only delimiters that remain are consistent across the sample records. To determine the final delimiter, the basic and regular oracles 30/32 from the oracle subsystem of FIG. 2C is called on these delimiters' associated field sets and the results are collected at step 58. The delimiters are ranked in terms of the number of fields and total record coverage that are recognized by the oracle subsystem and the final delimiter is chosen at step 60.

Figure 3B:
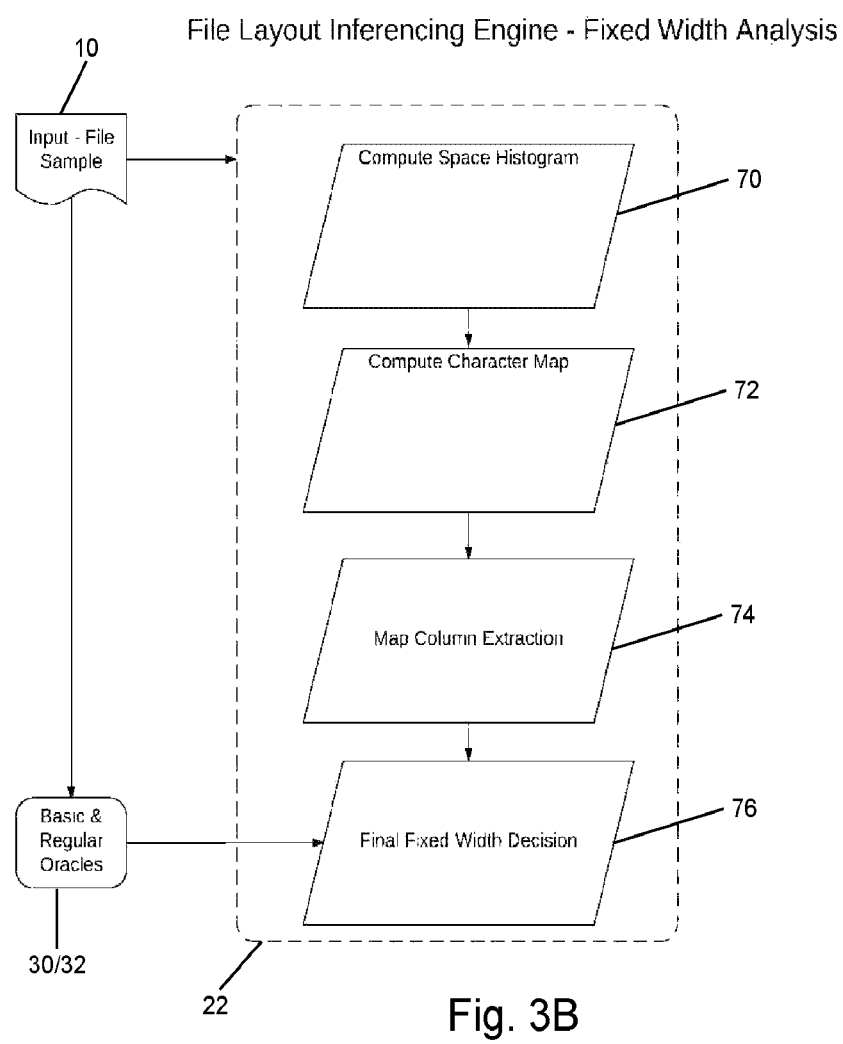
FIG. 3B is a detailed architectural flow of the fixed-length column analysis portion of the field position subsystem of a file layout inferencing system according to an implementation of the invention.
Figure 3C:
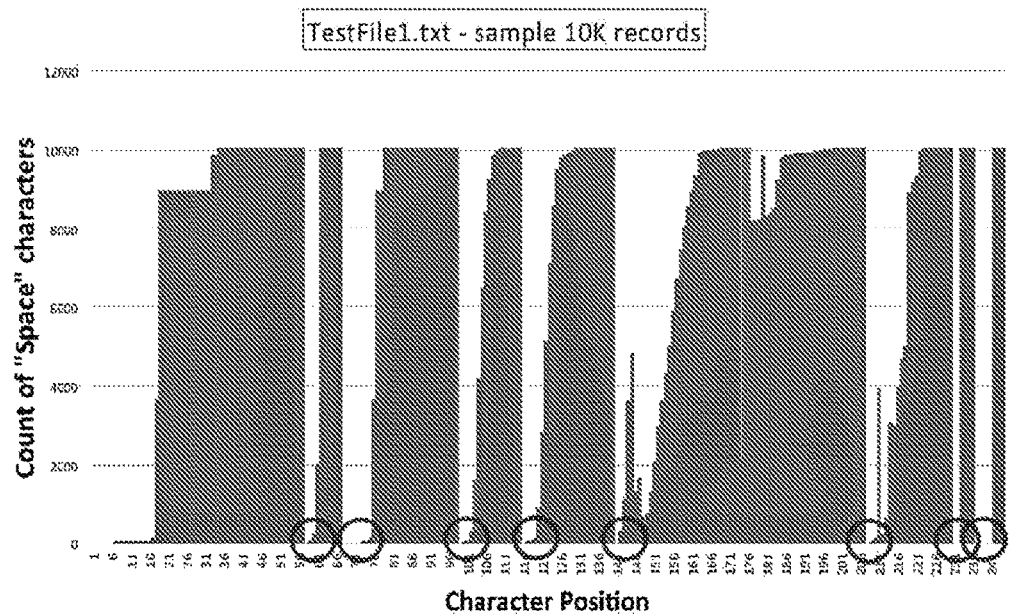
FIG. 3C is an example histogram of character position according to an implementation of the invention.

FIG. 3B illustrates the fixed-width column analysis 22 from FIG. 1 in more detail. The fixed-width column analysis represented by this figure attempts to compute the fields' fixed-width locations in case no field delimiter was identified for the file. The first step is to identify the field boundaries that are apparent due to the padding whitespace for the columns at step 70. As noted in FIG. 3B, a white space histogram is computed for the sample records at this step, as illustrated in FIG. 3C. This is done by counting for each character position in each of the sample records the number of times a non-blank character is in that position. The histogram in the figure is a bar graph where the height of the gray bars at each position indicates this count. Since this type of file consistently pads each of the fields in the same way, the positions that show a dramatic change from a large count to a small one or vice versa indicates a field boundary. The space histogram of FIG. 3C shows these kinds of boundaries with circles on the horizontal axis.

Figure 3D:
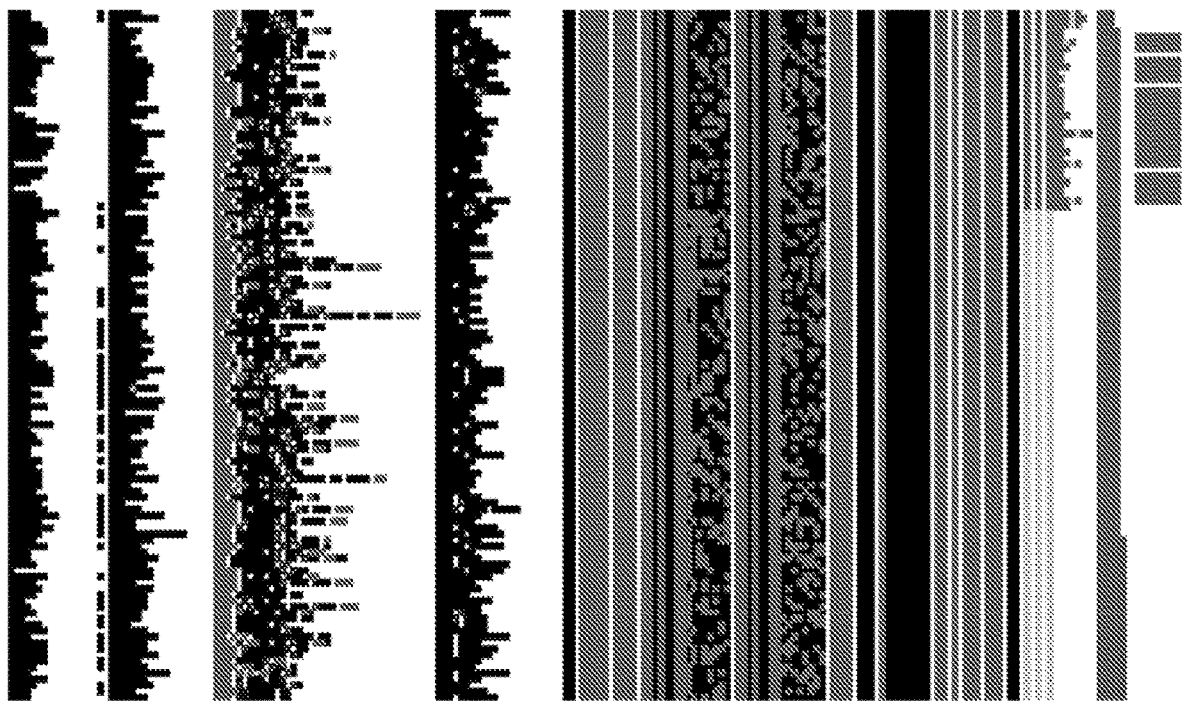
FIG. 3D is an example character map according to an implementation of the invention.
Figure 4:
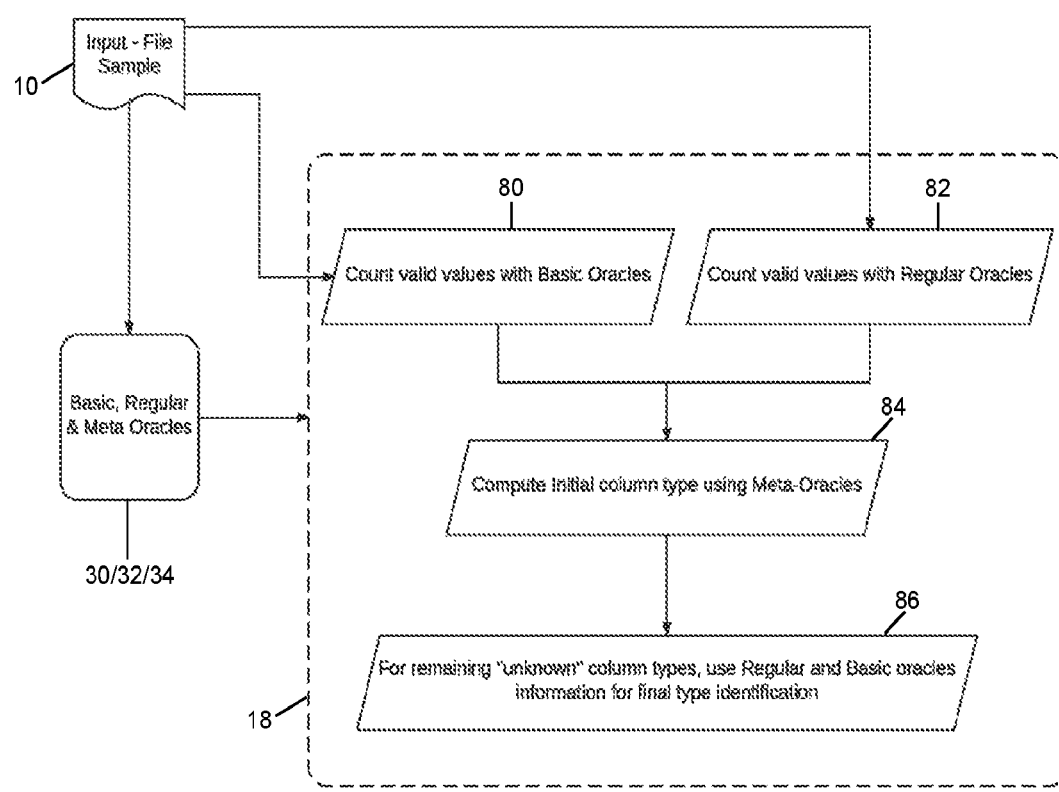
FIG. 4 is a detailed architectural flow of the process of the final field data type identification subsystem of a file layout inferencing system according to an implementation of the invention.

Once these boundaries are identified, a character map is computed for the sampled records at step 72. This map encodes each character by a color or shade pixel that indicates the basic character type. An example is provided in FIG. 3D. For the given character type in this figure, white represents spaces, black represents alphabetic characters, dark gray represents digit characters, and light gray represents punctuation characters. This image is quite expressive as it clearly delineates fields with different data types by the regularity and pattern of the colors. For the illustrated example, it is clear that the first field is a first name, the second is a middle initial, and the third is a last name. The next field is a complete street address field, containing both address numbers, street names, and secondary unit designators (apartment numbers). The address "123 Main St." is an example of an address that fits this pattern. The next field appears to be the city and the small two character field that follows is the state abbreviation. The ZIP codes no doubt appear next, but then additional context is needed for the interpretation of the other fields. Another pattern that is shown with one of the columns on the right side is a telephone number, which may be determined because it is composed of seven numeric characters. Because not all column boundaries can be identified based on the space histogram, which is particularly difficult with adjacent numerical column types, a count of the type of each character may be made for each character position based on if the character is a space, alphabetic, numeric, or punctuation type character.

The expressiveness of the character map not only serves a central role in identifying the field locations, but also can be used as a visual indication of many of the data types based on common usage sequencing of many fields.

The field (column) positions are identified with these two mappings at step 74, and once again the oracle subsystem (using basic oracles 30 and regular oracles 32) is called to help validate the column locations at step 76. However, sometimes some of the fields have very few entries from the records in the sample. Hence, if there is sufficient ambiguity from the resulting analysis, a larger sample can be used to reevaluate the file's field locations and types.

As noted above with reference to FIG. 1, once the locations of the fields have been identified, the third subsystem responsible for the final identification of the file's fields and data types proceeds to identify the data type for each field in the file as column type identification 18. As the first step, oracle subsystem 16 (from FIG. 1) is called and each basic oracle 30 and regular oracle 32 analyzes and returns a response for every identified field by means of the previously noted identification techniques, these being performed at steps 80 and 82, respectively. As noted earlier, different oracles can return a positive response for the same field, and this happens on a frequent basis, as there is a large set of common words that are used in personal, business, street, and city names. The responses and supporting data are collected from each of these oracles (previously noted value frequency distributions, numbers of instances in the same field, number of records whose data values meet the oracle's criteria for identification, and locational information) for each field in preparation for the subsequent analysis. Each field records these two sets of results for the upcoming analysis.

Once the above-mentioned data is collected, the meta-oracles 34 are used at step 84 to determine if there are adjacent fields that make up a single large data type, for example a full name or full address. Each of these large data types has fundamental patterns of construction. For example, a full name data type is formed from some number of adjacent alphabetic "name" data types. There may be only one field where the full name was placed, and commonly there can be up to five consecutive fields that hold the full name (Name Title/Prefix, First Name, Middle Name, Last Name, and Name Generational Suffix). The full address field can also be formed from one or more consecutive fields with a mix of alphabetic, numeric, and alphanumeric field types. Hence each meta-oracle 34 need not consider every possible sequence of fields, but rather begin by looking for a single field that contains multiple values whose sequence is consistent within its large data type. Then the oracle can identify pairs of consecutive fields for which a combination of data types form a sub-pattern of the oracle's large data type (for example, a digits field and a street name field). Once such candidates are found, the meta-oracle 34 searches the adjacent fields to see if a combination of the reported data types for the candidate and new fields are consistent with the oracle's data type and, if so, these new fields are added to the candidate set. This process continues until either no new field can be added in a consistent way or a complete set of fields that form the data type has been found. This process is continued throughout the set of fields not included in any candidate set. In the case of a potential field overlap between two candidates, the overlapping field can be removed from the earlier group of fields and added to the present prospecting fields if the earlier group was not a complete instance of the oracle's data type. As was noted earlier with an example, fields often have multiple positive responses that can create a degree of ambiguity. Hence the meta-oracles 34 must look at potential sequences of fields and determine whether these multiple responses can be pieced together to form a valid meta-type. After all of the candidate sets have been identified, those that form complete instances of the associated data type are identified by the meta-oracles.

Once any such meta-types have been identified, the remaining field types are determined at step 18. This determination is based on choosing a data type for a largest number of fields whose sequential interpretation is valid. The validity of the sequencing of the chosen field types is based on highly consistent and common relational patterns of the data types. The relational patterns used include the assumption that a sequence of individuals' name fields would not contain a field with any form of a digits data type. Also included is the rule that address components such as state abbreviations and zip codes will not be found in fields that are not adjacent to other standard address data types such as city name or street name. Another assumption that is made is that there are usually no more than two date fields in the vast majority of files, and if there are two such fields they are usually adjacent or within a very few fields of each other. To illustrate, example data is provided in Table 4.

TABLE 4

| | | | |
|---|---|---|---|
| First Name | ✓ | | ✓ | |
| Last Name | | | ✓ | ✓ |
| Alphabetic | ✓ | | ✓ | ✓ |
| Digit | | ✓ | | |
| Phone | | ✓ | | |
| Business Name | ✓ | | | ✓ |

In the example of Table 4, the full name meta-oracle 34 would not have grouped the four fields into a full name due to the second field of digits. The last two fields do form a variation of a full name data type (which the full name meta-oracle 34 will have identified as such). The first field will not be identified as a First Name field as it is uncommon for a first name to be isolated in such data files. Since the second field is potentially a phone number and the first field is also an expected business name, identifying each of these two fields by these types follows common practice for layouts of business data files. On the other hand, if the first field was not identified as a potential business name and another field has already been identified as a phone number, the second field would be identified as a digits field. It is not unusual that one type of alphabetic or numeric field has strong patterns for several highly different field types (all digit dates and identification codes are common instances). Hence it is important to have both basic and regular oracles interpret such fields so that the appropriate specific or generic data type can be correctly chosen.

Once all of the fields have been processed in this manner and there appear to be too many fields given a basic type, a second pass through the fields can occur with the intention of making small adjustments to decrease the number of such basic types of fields while keeping the consistency of the sequential patterns. This is done by reconsidering those fields that have multiple potential candidate data types with strong evidence. If any of these are adjacent to fields with an assigned basic data type, then each such strong candidate is substituted to see if the basic data type field can then be adjusted to a regular data type while persisting the consistency of the interpretation of the resulting fields.

Figure 5:
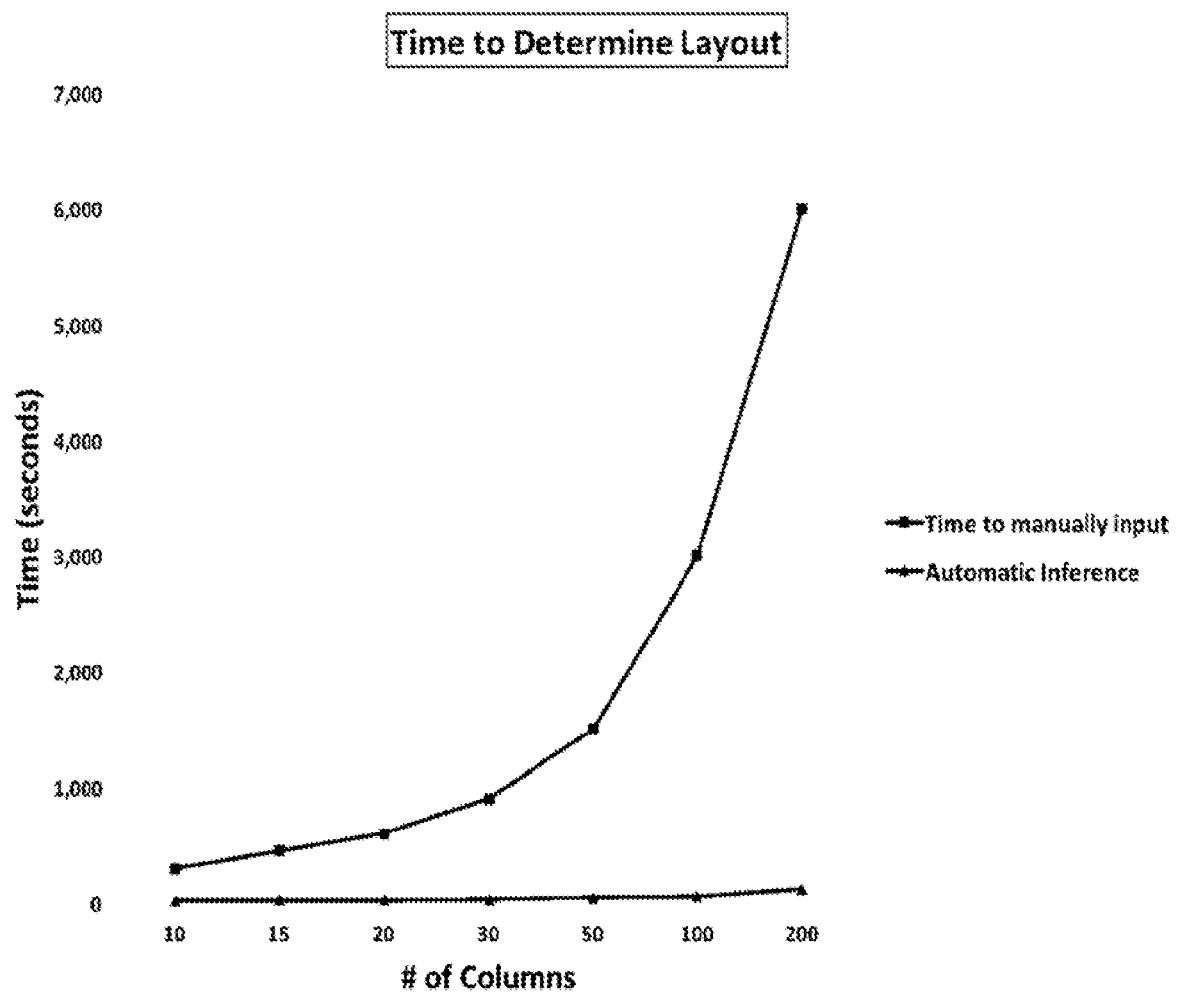
FIG. 5 is a schematic for a hardware system according to an implementation of the invention.

FIG. 5 represents a comparison of the time to determine a data file's layout between a manual system as currently performed in the art and a specific implementation of this invention. These represented times are from the initial analysis of the sample records to the final determination and output of the final column data types. This instance of the invention was implemented on a single Linux x86_64 processor machine running RedHatEnterpriseServer 6.7 with 4 CPUs and 16 GB of RAM. The code for the implementation of all of the subsystems was written in Python 3.4.2. An instance of the Flask micro-framework for a web service was installed (BSD license—http://flask.pocoo.org/) and the resulting REST API allows any user from any location to access the system. Each file's data is passed from the user to the system through a POST command. The final results are returned to the user via a JSON structure through the API.

The greatest time complexity is in the final analysis of the column data types once the basic and regular oracles have reported their findings for each column. As the number of columns increases, the number of potential column interpretation combinations grows exponentially. For a small number of total columns, such as five or less, the time to identify the layout is under two seconds. For files with 100 to 200 columns the layout is determined in a time between one and two minutes.

One specific batch run of this instance consisted of 63 different data files containing both delimited and fixed-width layouts and a variety of numbers of columns. There were a total of more than 1000 columns. The full time to completely process these files, including the download time of the data to the service, was 25 minutes.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for determining a file layout from a data file comprising a plurality of records each comprising a plurality of fields, the method steps comprising:
  a. receiving the data file at an inference engine;
  b. performing preliminary analysis on the data file, wherein the preliminary analysis comprises the step of determining whether the data file is a field delimited file or a fixed-width field file by analyzing at least one of the plurality of records, wherein the step of performing preliminary analysis on the data file is based solely on the plurality of records in the data file and without reading a source format file for the data file or reading a rules file to translate from the data file;
  c. if the data file is determined to be a field delimited file, performing a delimited analysis to the data file;
  d. if the data file is determined to be a fixed-width field file, performing a fixed-width analysis to the data file;
  e. applying a column-type identification to the data file, wherein the step of applying a column-type identification to the field file comprises the steps of applying at least one basic oracle to identify a primitive data pattern in the records, wherein a primitive data pattern comprises a specific type of character and wherein the at least one basic oracle comprises one or more of an alpha oracle, an alphanumeric oracle, a blank oracle, a digit oracle, or a numeric oracle; at least one regular oracle to identify field types in the records, wherein field types comprise a set of characters following a known pattern; and at least one meta oracle to identify single data types that cross multiple fields in the records to the data file, wherein the at least one meta oracle comprises each of a full address oracle and a full name oracle, wherein the steps of applying at least one basic oracle, at least one regular oracle, and at least one meta oracle to the data file comprises the step of making multiple potentially fallible decisions as to expected data types of each field in the data file using different oracles, and further comprising the step of combining the results of the multiple potentially fallible decisions to make a best choice as to the expected data type of each field in the data file, and wherein the step of applying a column-type identification to the field file comprises the step of analyzing multiple rows of records in the data file to determine an overall column identification for the data file; and
  f. outputting a final column type information for the data file.

2. The method of claim 1, wherein the at least one basic oracle comprises each of an alpha oracle, an alphanumeric oracle, a blank oracle, a digit oracle, and a numeric oracle.

3. The method of claim 1, wherein the at least one regular oracle comprises one or more of an address link oracle, a consumer link oracle, a document identifier oracle, a business name oracle, a city oracle, a country oracle, a country oracle, a date oracle, a domain oracle, an email oracle, a first name oracle, or a gender oracle.

4. The method of claim 3, wherein the at least one regular oracle comprises each of an address link oracle, a consumer link oracle, a document identifier oracle, a business name oracle, a city oracle, a country oracle, a country oracle, a date oracle, a domain oracle, an email oracle, a first name oracle, and a gender oracle.

5. The method of claim 1, wherein the step of performing a delimited analysis on the file comprises the steps of:
  a. computing an initial frequency table for non-numeric, non-alphabetic characters;
  b. counting the number of columns for each row in the data file using a trial delimiter from a set of possible delimiters;
  c. summarizing the column counts by the number of fields and rows;
  d. filtering out low summary counts;
  e. using one or more of a basic oracle or a field oracle to rank field counts; and
  f. outputting a final delimited decision.

6. The method of claim 1, wherein the step of performing a fixed-width analysis on the file comprises the steps of:
  a. creating a space histogram on the data file;
  b. creating a character map on the data file;

c. mapping column extraction onto the data file using one or more of the space histogram and character map; and d. outputting a final fixed-width decision.

7. The method of claim 1, wherein the step of applying a column-type identification to the data file comprises the steps of:

a. using at least one basic oracle, counting valid values in the data file;
   b. using at least one regular oracle, counting valid values in the data file;
   c. computing an initial column type using at least one meta oracle following the steps of counting valid values in the data file using the at least one basic oracle and at least one regular oracle;
   d. if there are any remaining unknown column types, applying one or more regular oracle or basic oracle information;
   e. outputting a final type determination.

8. The method of claim 1, wherein the step of applying a column-type identification to the data file comprises the analysis of the contents of each field in at least ten thousand records in the data file.

9. The method of claim 1, wherein the step of applying a column-type identification to the data file comprises the analysis of the contents of each field in at least one hundred thousand records in the data file.

10. The method of claim 1, wherein the step of applying a column-type identification to the data file comprises the analysis of the contents of each field in at least one million records in the data file.

11. A system for determining a file layout from a data file comprising a plurality of records each comprising a plurality of fields, comprising:

a. a processor;
   b. a nonvolatile memory coupled to the processor and comprising computer readable program code embodied in the nonvolatile memory;
   c. a plurality of basic oracles each comprising program code stored on the nonvolatile memory, wherein each basic oracle is a software program running on the processor and operable to determine the existence of a specific type of character or characters in at least one of the plurality of fields from analyzing multiple rows of records in the data file, and wherein at least one of the plurality of basic oracles comprises an alphabetic oracle, a numeric oracle, an alphanumeric oracle, a digit oracle, or a blank oracle;
   d. a plurality of regular oracles, wherein each regular oracle is a software program running on the processor and operable to identify common and frequently occurring field types that have at most a small number of common representations in at least one of the plurality of fields from analyzing multiple rows of records in the data file, and wherein at least one of the plurality of regular oracles comprises an address link oracle, a consumer link oracle, a document identifier oracle, a business name oracle, a city oracle, a country oracle, a date oracle, a domain oracle, an email oracle, a first name oracle, a last name oracle, or a gender oracle;
   e. a plurality of meta oracles, wherein each meta oracle is a software program running on the processor and operable to identify complex data types extending across two or more of the plurality of fields using either or both of adjacent fields and the position of fields with respect to each other in each of the plurality of records from analyzing multiple rows of records in the data file, and wherein at least one of the plurality of meta oracles comprises a full address oracle or a full name oracle; and
   f. an oracle analysis subsystem running on the processor and operable to apply the basic oracles, regular oracles, and meta oracles to at least a subset of the plurality of records in the data file to determine a column identification for the data file by analyzing at least one of the plurality of records, wherein the analysis of the oracle analysis subsystem solely utilizes the plurality of records in the data file and without reading a source format file for the data file or reading a rules file to translate from the data file, wherein the oracle analysis subsystem is further operable to receive multiple and potentially fallible overlapping decisions from the basic oracles, regular oracles, and meta oracles, and select a best choice for at least one of a field type and a field location from multiple possible interpretations based on the overlapping decisions from the basic oracles, regular oracles, and meta oracles.

12. The system of claim 11, wherein, for at least one of the plurality of fields, a basic oracle is operable to return a true finding and a regular oracle is operable to return a true finding for the same field, and wherein the oracle analysis subsystem is operable to select the regular oracle finding over the basic oracle finding to determine the field type.

13. A method for determining a file layout from a data file comprising a plurality of records each comprising a plurality of fields, the method steps comprising:

a. using at least a subset of the records in the data file, determining any existence of a specific type of character or characters in at least one of the plurality of fields from analyzing multiple rows of records in the data file;
   b. using at least a subset of the records in the data file, identifying any common or frequently occurring field types that have at most a small number of common representations in at least one of the plurality of fields from analyzing multiple rows of records in the data file;
   c. using at least a subset of the records in the data file, identifying any complex data types extending across two or more of the plurality of fields using either or both of adjacent fields and the position of fields with respect to each other from analyzing multiple rows of records in the data file;
   d. applying the results of steps (a)-(c) to determine an overall column identification for the data file wherein the step of determining overall column identification is performed on the data file based solely on the plurality of records in the data file and without reading a source format file for the data file or reading a rules file to translate from the data file, and comprises the sub-steps of making multiple potentially fallible decisions as to expected data types of each field in the data file, and combining the results of the multiple potentially fallible decisions to make a best choice as to the expected data type of each field in the data file; and
   e. determining whether the data file is a field delimited file or a fixed-width field file, and if the data file is determined to be a field delimited file, performing a delimited analysis to the data file, or, if the data file is determined to be a fixed-width field file, performing a fixed-width analysis to the data file, wherein the step of performing a delimited analysis on the file comprises the sub-steps of computing an initial frequency table for non-numeric, non-alphabetic characters, counting the number of columns for each row in the data file using a trial delimiter from a set of possible delimiters, summarizing the column counts by the number of fields and rows, filtering out low summary counts, and ranking the field counts, and wherein the step of performing a fixed-width analysis on the file comprises the steps of creating one or both of a space histogram or a character map on the data file, and mapping a column extraction onto the data file using one or both of the space histogram or the character map.

* * * * *